(No Model.) 2 Sheets—Sheet 1.
H. H. KENDRICK.
STRAW CUTTER.
No. 455,105. Patented June 30, 1891.
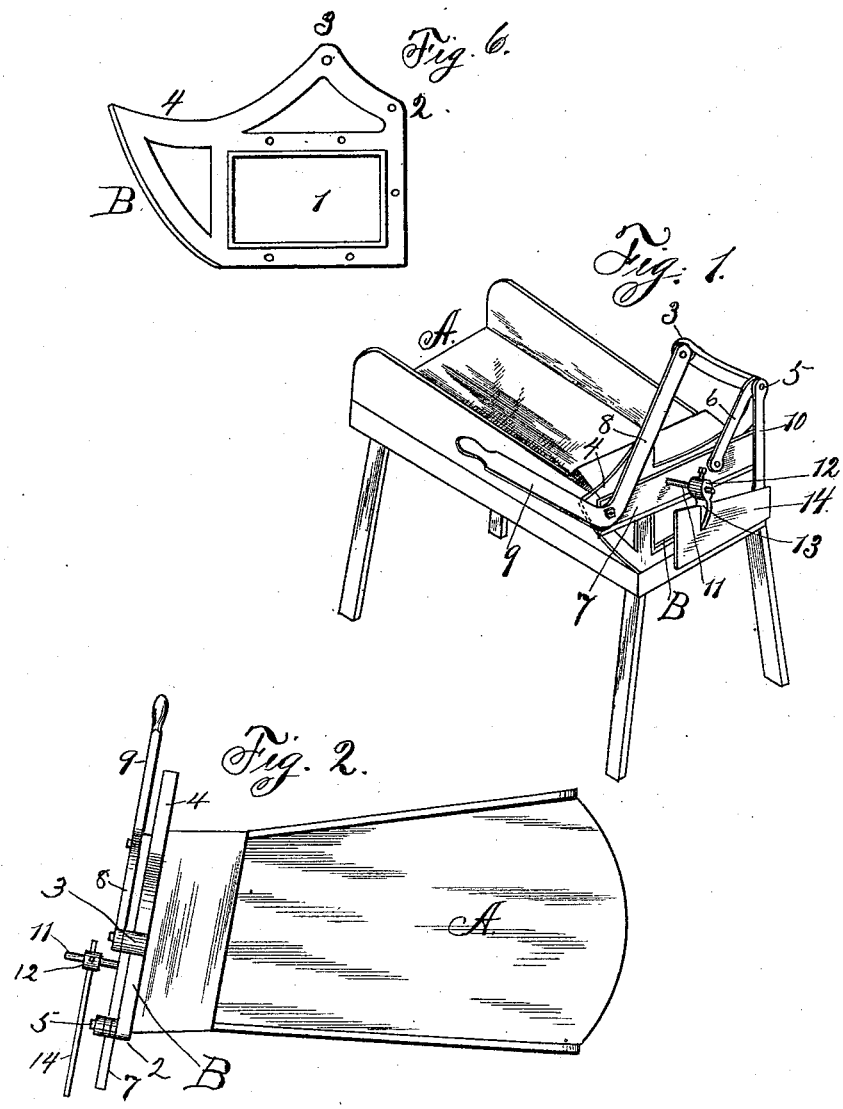

(No Model.) 2 Sheets—Sheet 2.

H. H. KENDRICK.
STRAW CUTTER.

No. 455,105. Patented June 30, 1891.

Witnesses
H. P. Denison
H. W. Celay

Inventor
Hiland H Kendrick
By his Attorneys
Smith & Denison

UNITED STATES PATENT OFFICE.

HILAND H. KENDRICK, OF FULTON, NEW YORK.

STRAW-CUTTER.

SPECIFICATION forming part of Letters Patent No. 455,105, dated June 30, 1891.

Application filed November 26, 1889. Serial No. 331,672. (No model.)

*To all whom it may concern:*

Be it known that I, HILAND H. KENDRICK, of Fulton, in the county of Oswego, in the State of New York, have invented new and useful Improvements in Straw-Cutters, of which the following, taken in connection with the accompanying drawings, is a full, clear, and exact description.

My invention relates to straw-cutters in which the cutting-knife swings upon suspension-bars and is operated by a handle connected to the knife-bar.

My object is to produce an effective and durable implement in which the knife has a shearing and drawing cut and in which an adjustable gage is carried upon the knife-bar to regulate the length of the cut.

My invention consists in the several novel features of construction and operation hereinafter described, and which are specifically set forth in the several clauses of claim hereunto annexed.

It is constructed as follows, reference being had to the accompanying drawings, in which—

Figure 3:
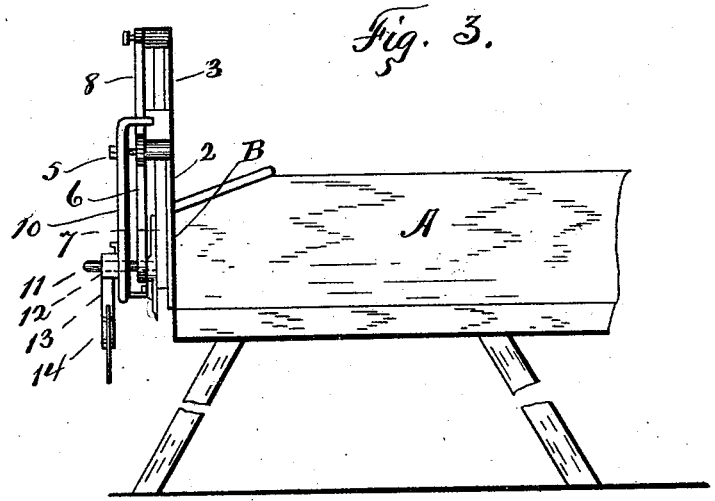
Figure 4:
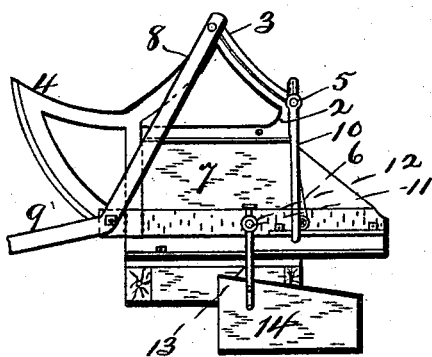
Figure 5:
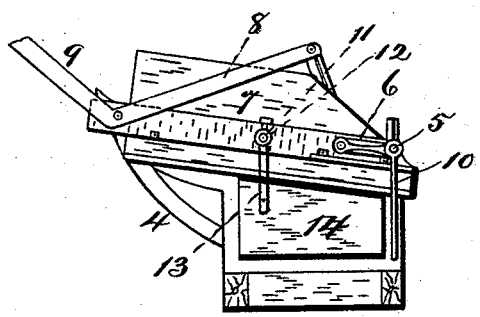

Figure 1 is an isometrical elevation. Fig. 2 is a top plan view. Fig. 3 is a side elevation. Fig. 4 is a front elevation of the front end, showing the knife down at the close of the stroke of a cut. Fig. 5 is a like view of the same, showing the knife raised, ready to make a downstroke or cut, and the gage in front of the opening in the front of the machine, so that the straw when fed forward will strike against it. Fig. 6 is a front elevation of the throat-frame.

A is the body, upon the front end of which a metallic frame B is secured, comprising a throat 1, an upright post 2, a top bearing 3, and a side arm 4. As shown in Fig. 2, this frame is mounted diagonally across the front end of the box. From a bolt 5 through the post 2 I suspend a rod 6, the lower end of which is pivotally connected to the knife-bar 7, and from the top 3 I suspend the bar 8, the lower end of which is pivotally connected to the knife-bar, which is thus suspended by rods of unequal length from the frame. The handle 9 is connected to or integral with the bar 8. A rigid knife-guide 10 is secured upon the bolt 5 and hangs in front of, parallel with, and contiguous to the knife-bar and operates to maintain it vertically in position. A rod 11 projects from the front of the knife-bar, upon which I mount a sleeve 12 adjustably, and a bar 13 extends down from this sleeve, to which a gage-plate 14 is secured, and this plate regulates the length of the cut by the adjustment of this sleeve upon the rod 11.

When the knife hangs in the position shown in Fig. 4, a pull upon the handle will raise it up, as shown in Fig. 5, ready for a cut, and the gage-plate will close the throat so that the material can be fed out against it, and then pushing down upon the handle and toward the machine swings the knife down with a shearing and drawing cut through the material. It will be observed that I obtain this motion for the knife by suspending it by bars of unequal length.

What I claim as my invention is—

The combination, with the box of a straw-cutter, of a throat-frame mounted obliquely across the front end thereof, upward arms of unequal length integral with the frame, a knife suspended from the arms by bars of unequal lengths, a handle integral with one of said bars and pivotally connected to the knife, a feed-gage suspended from the knife-bar and movable vertically with the movement of the knife, and a knife-guide suspended from the frame in front of the knife.

In witness whereof I have hereunto set my hand this 29th day of October, 1889.

HILAND H. KENDRICK.

In presence of—
 H. P. DENISON,
 ARVIN RICE,
 EMMA COATES.